(12) United States Patent
Chuang (10) Patent No.: US 7,156,409 B2
(45) Date of Patent: Jan. 2, 2007

(54) COLLAPSIBLE BICYCLE

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 0 days.

(21) Appl. No.: 10/908,098

(22) Filed: Apr. 27, 2005

(65) Prior Publication Data

US 2006/0244237 A1 Nov. 2, 2006

(51) Int. Cl.
*B62K 15/00* (2006.01)
*B62K 13/08* (2006.01)
(52) U.S. Cl. .................... 280/287; 280/278; 280/281.1
(58) Field of Classification Search ................. 280/287
See application file for complete search history.

(56) References Cited

U.S. PATENT DOCUMENTS

| | | | | |
|---|---|---|---|---|
| 3,623,749 | A * | 11/1971 | Jensen | 280/278 |
| 4,202,561 | A * | 5/1980 | Yonkers | 280/278 |
| 4,842,292 | A * | 6/1989 | Wang | 280/287 |
| 6,530,589 | B1 * | 3/2003 | Ma | 280/278 |
| 6,595,539 | B1 * | 7/2003 | Belli | 280/287 |
| 6,883,817 | B1 * | 4/2005 | Chu | 280/278 |
| 2001/0045723 | A1 * | 11/2001 | Niitsu et al. | 280/287 |

OTHER PUBLICATIONS

Taiwan Patent Publication No. M246267, Oct. 11, 2004, 10 pages.

* cited by examiner

*Primary Examiner*—Lesley D. Morris
*Assistant Examiner*—Marlon Arce-Diaz
(74) *Attorney, Agent, or Firm*—Alan D. Kamrath; Nikolai & Mersereau, P.A.

(57) ABSTRACT

A collapsible bicycle includes a collapsible frame and a retaining device. The collapsible frame can be switched between an extended position and a collapsed position in a longitudinal direction. The wheels of the collapsible bicycle can still roll on the ground when the collapsible frame is in the collapsed position. The retaining device includes a trigger. The trigger can be operated in order to switch the retaining device between a retaining position and a releasing position. In the locking position, the retaining device retains the collapsible frame in the extended position. In the releasing position, the retaining device allows the collapsible frame to be switched to the collapsed position.

28 Claims, 13 Drawing Sheets

COLLAPSIBLE BICYCLE

BACKGROUND OF INVENTION

1. Field of Invention

The present invention relates to a bicycle and, more particularly, to a collapsible bicycle.

2. Related Prior Art

As disclosed in Taiwanese Patent Publication M246267, FIGS. 5 to 10, a collapsible bicycle includes a foldable tube 50 and a joint 60. The foldable tube 50 includes two separate sections 51 and 52. The joint 60 includes two boxes 61 and 62 and a link 63. The box 61 includes a portion fit in the section 51. The box 62 includes a portion fit in the section 52. The box 61 is connected with the box 62 through the link 63. Thus, the foldable tube 50 can be switched between an extended position and a folded position. A quick-release device 65 is used to keep the foldable tube 50 in the extended position. The quick-release device 65 includes a lever 651, a cam 6510 formed at an end of the lever 651 and an anchor 652 pivotally connected with the cam 6510. The lever 651 and the cam 6510 are put in the box 61. The anchor 652 can be put in the box 62 when the foldable tube 50 is in the extended position. The quick-release device 65 can be switched between a locking position and a releasing position through operating the lever 651. In the locking position, the cam 6510 and the anchor 652 force a portion of the box 61 firmly against a portion of the box 62.

Several problems have been encountered in using this conventional collapsible bicycle. Firstly, the quick-release device 65 is exposed on one side, and can be tangled with an object and pivoted to the releasing position. Secondly, the cam 6510 can be rotated to the releasing position because of vibration during a ride. Thirdly, there is nothing to ensure that the quick release device 65 be kept in the locking position. Fourthly, the collapsing of the collapsible bicycle is slow. Fifthly, in the collapsed position, the collapsible bicycle still occupies a large space. Sixthly, in the collapsed position, the collapsible bicycle must be carried, i.e., its wheels must be lifted from the ground, and this is exhausting.

Therefore, the present invention is intended to obviate or at least alleviate the problems encountered in the prior art.

According to the present invention, a collapsible bicycle includes a collapsible frame and a retaining device. The collapsible frame can be switched between an extended position and a collapsed position in a longitudinal direction. The wheels of the collapsible bicycle can still roll on the ground when the collapsible frame is in the collapsed position. The retaining device includes a trigger. The trigger can be pulled in order to switch the retaining device between a locking position and a releasing position. In the locking position, the retaining device retains the collapsible frame in the extended position. In the releasing position, the retaining device allows the collapsible frame to be switched to the collapsed position.

An advantage of the collapsible bicycle of the present invention is the easy collapsing of the collapsible bicycle.

Another advantage of the collapsible bicycle is that it occupies a small space in the collapsed position.

Another advantage of the collapsible bicycle of the present invention is that it can easily be pushed in the collapsed position as the wheels can still roll on the ground.

Other advantages and novel features of the invention will become more apparent from the following detailed description in conjunction with the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
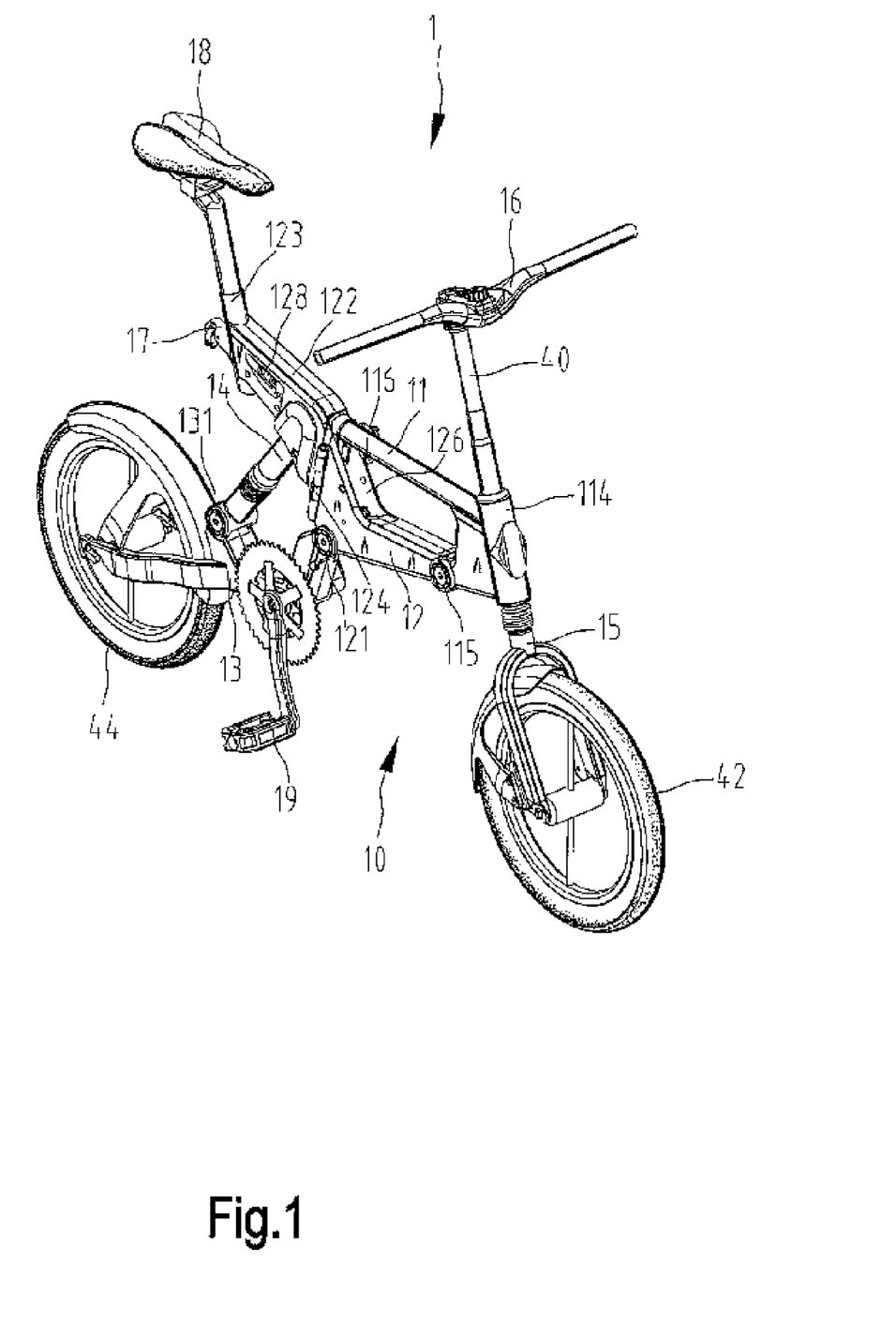
FIG. 1 is a perspective view of a collapsible bicycle according to the preferred embodiment of the present invention.
Figure 2:
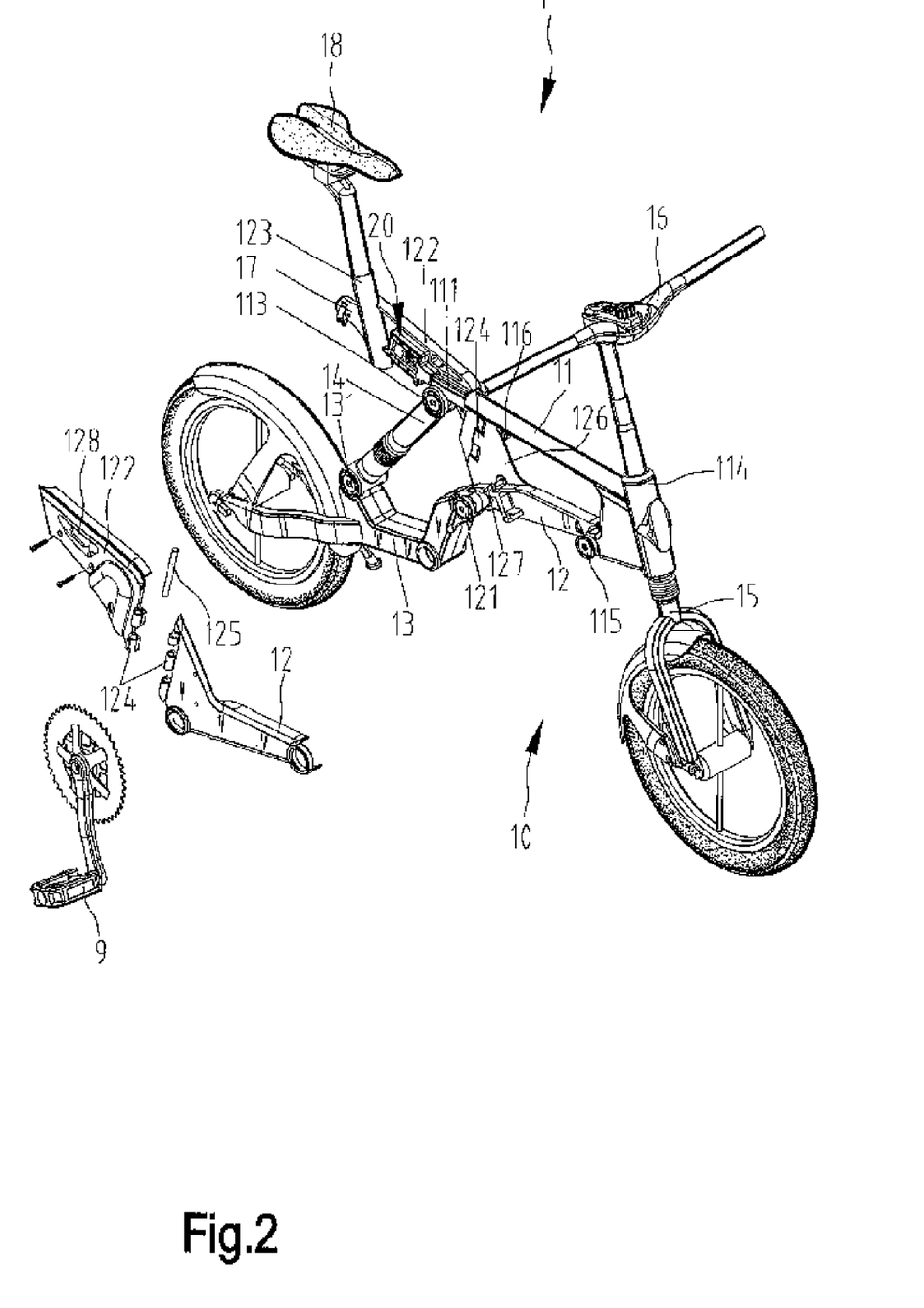
FIG. 2 is an exploded view of the collapsible bicycle shown in FIG. 1.
Figure 10:
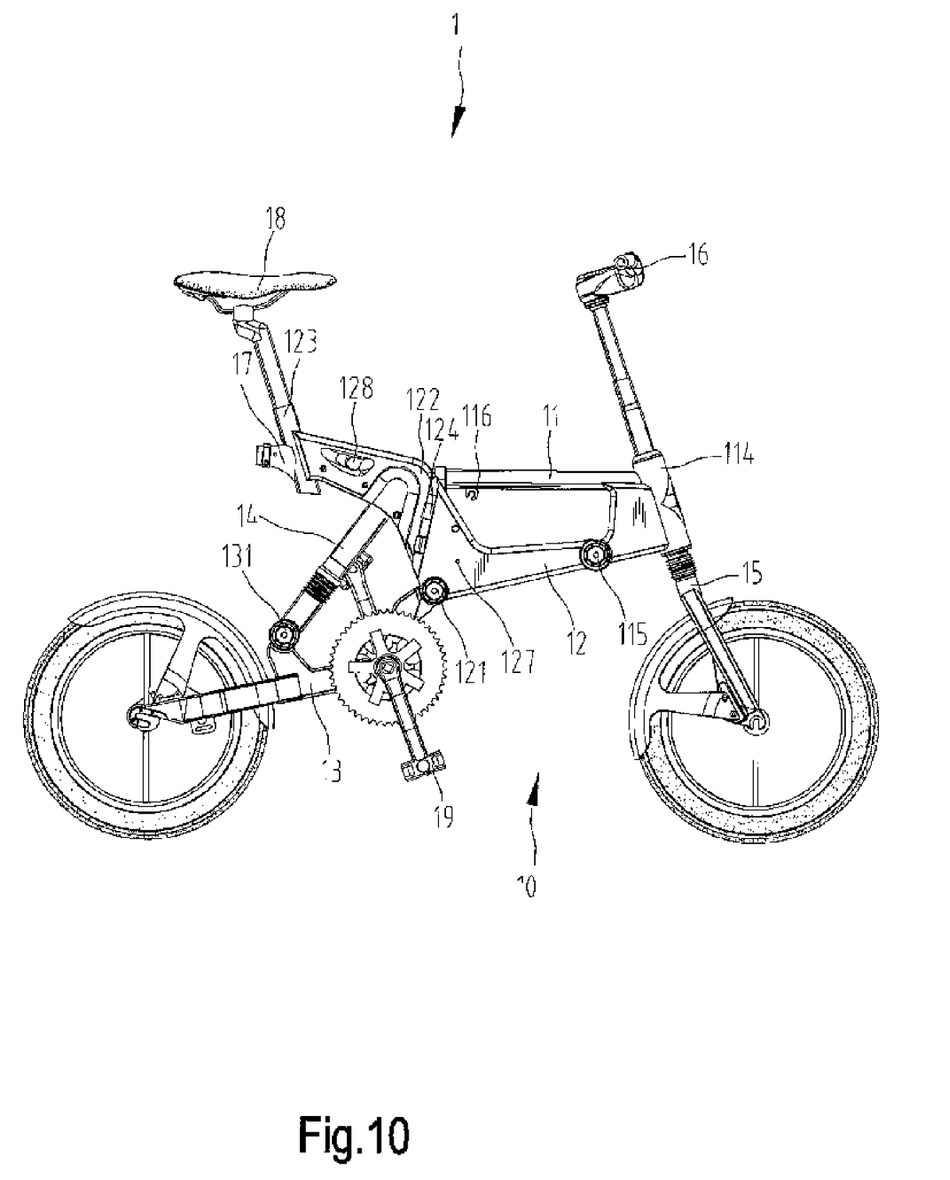
FIG. 10 is a side view of the collapsible bicycle shown in FIG. 1 in an extended position.
Figure 11:
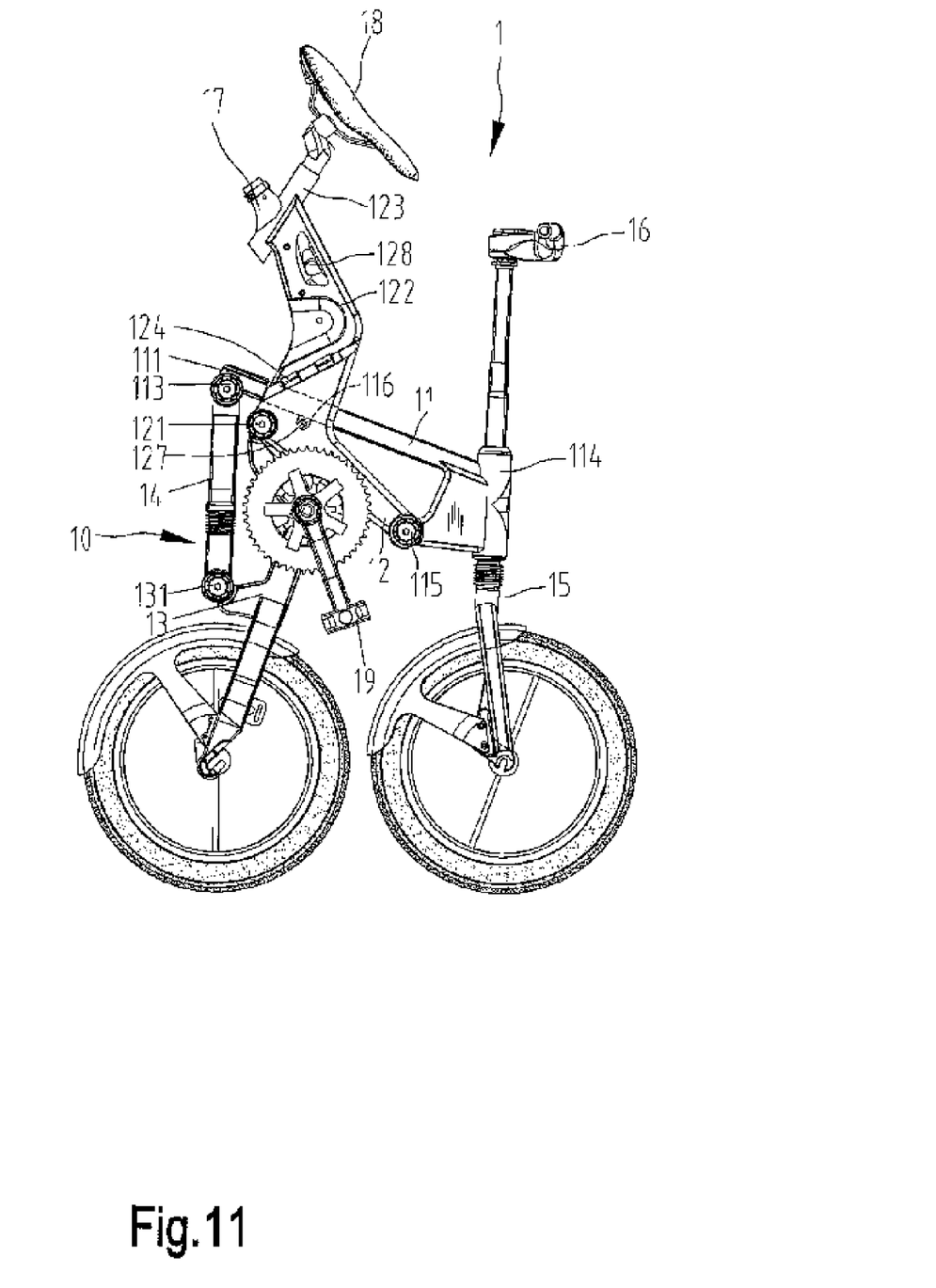
FIG. 11 is a side view of the collapsible bicycle shown in FIG. 1 in a transient position.
Figure 13:
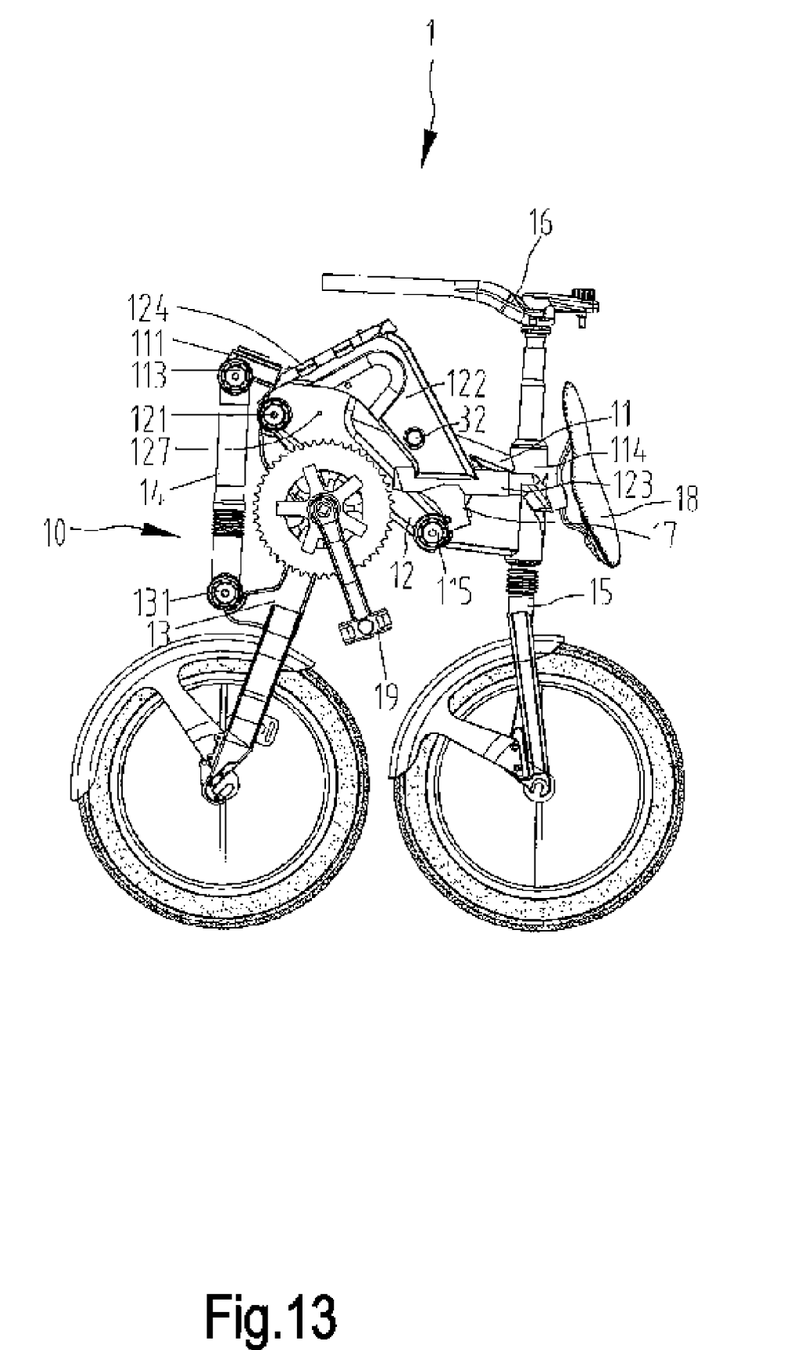
FIG. 13 is a side view of the collapsible bicycle shown in FIG. 1 in a collapsed position.

According to the preferred embodiment of the present invention, a collapsible bicycle 1 can be switched between an extended position shown in FIGS. 1, 2 and 10 and a collapsed position shown in FIG. 13 through a transient position shown in FIG. 11.

Figure 3:
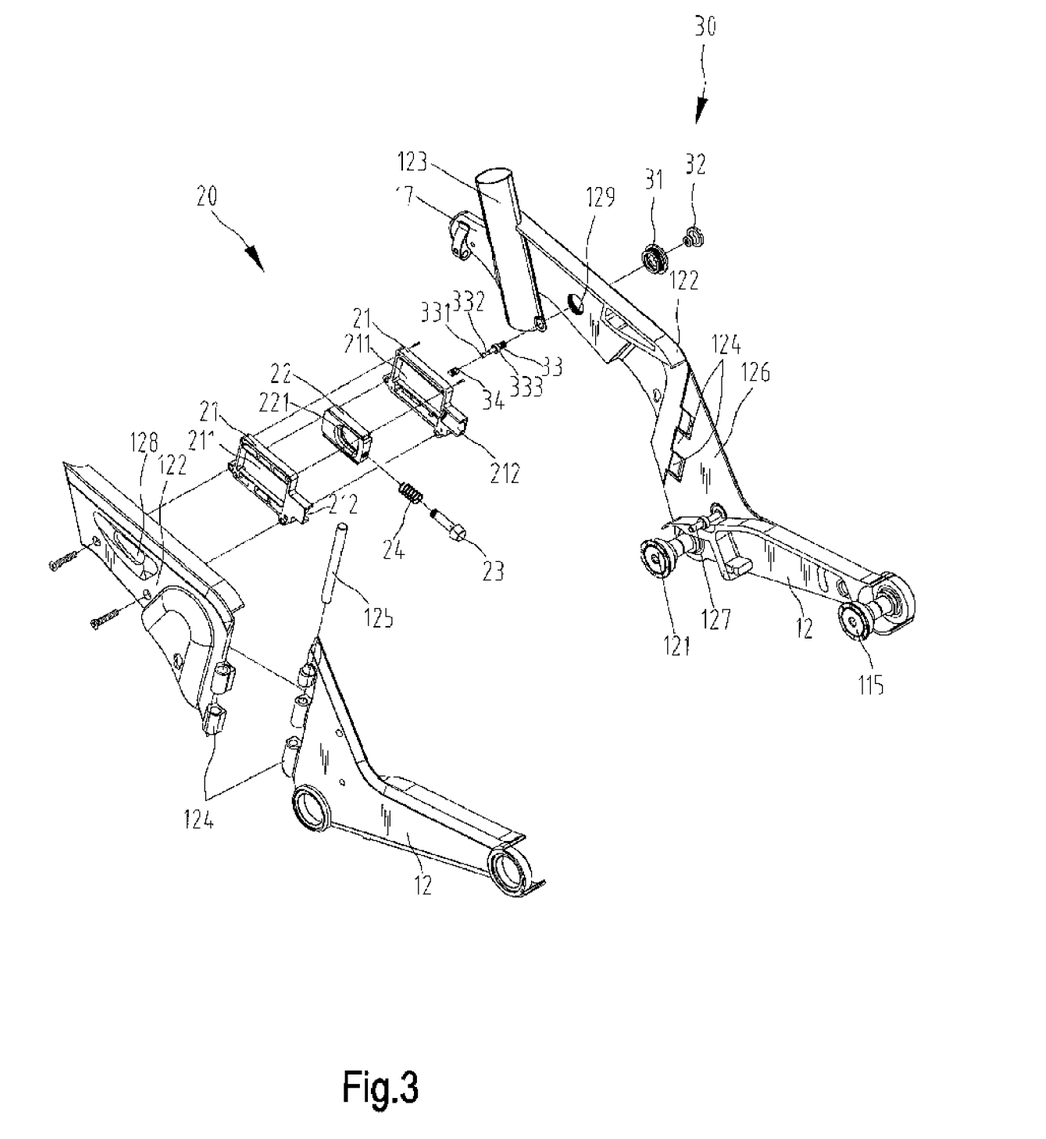
FIG. 3 is an enlarged exploded view of a portion of the collapsible bicycle shown in FIG. 2.

Referring to FIGS. 1 through 3, the collapsible bicycle 1 includes a collapsible frame 10, a retaining device 20 and a security device 30. The collapsible frame 10 can be switched between an extended position and a collapsed position in a longitudinal direction.

Figure 4:
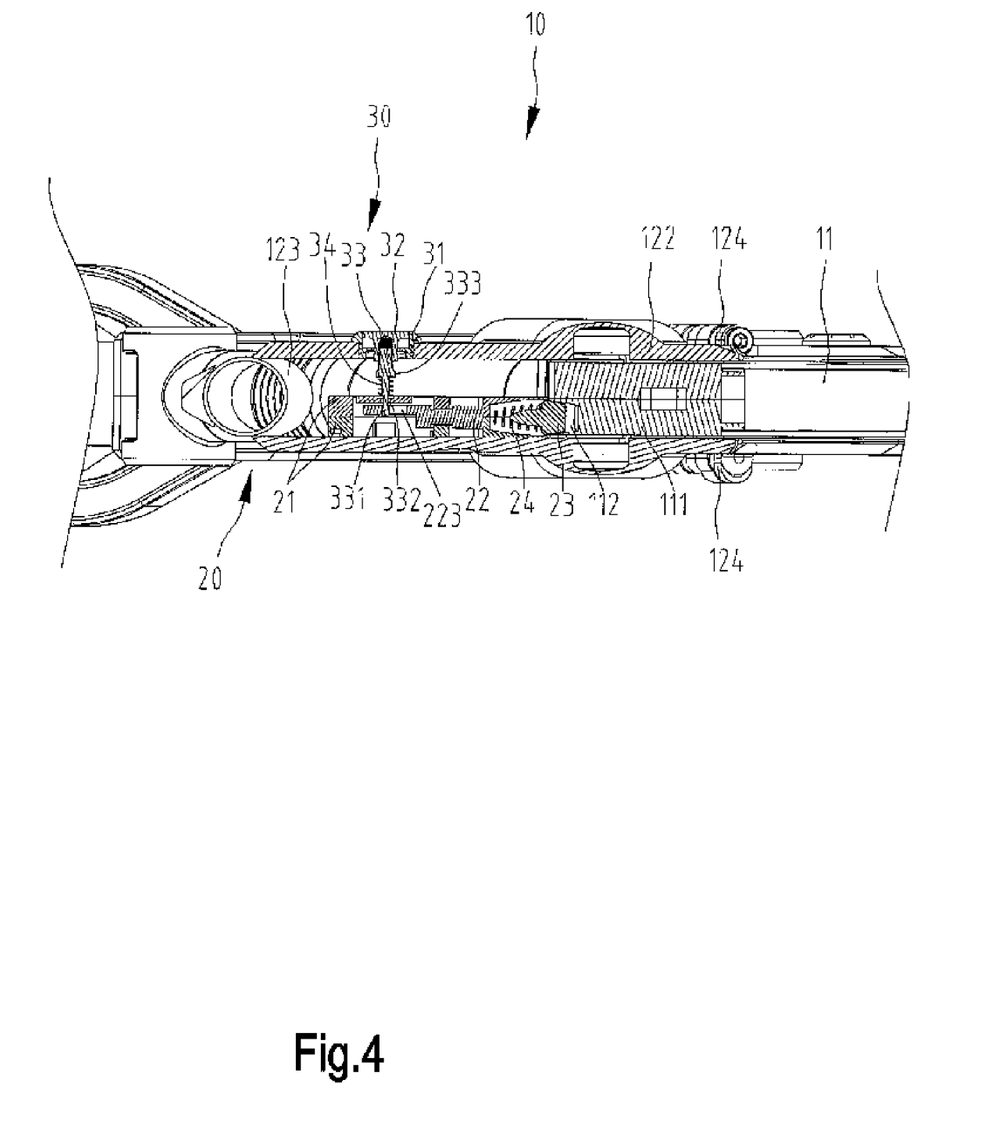
FIG. 4 is a cross-sectional view of the collapsible bicycle shown in FIG. 3.
Figure 5:
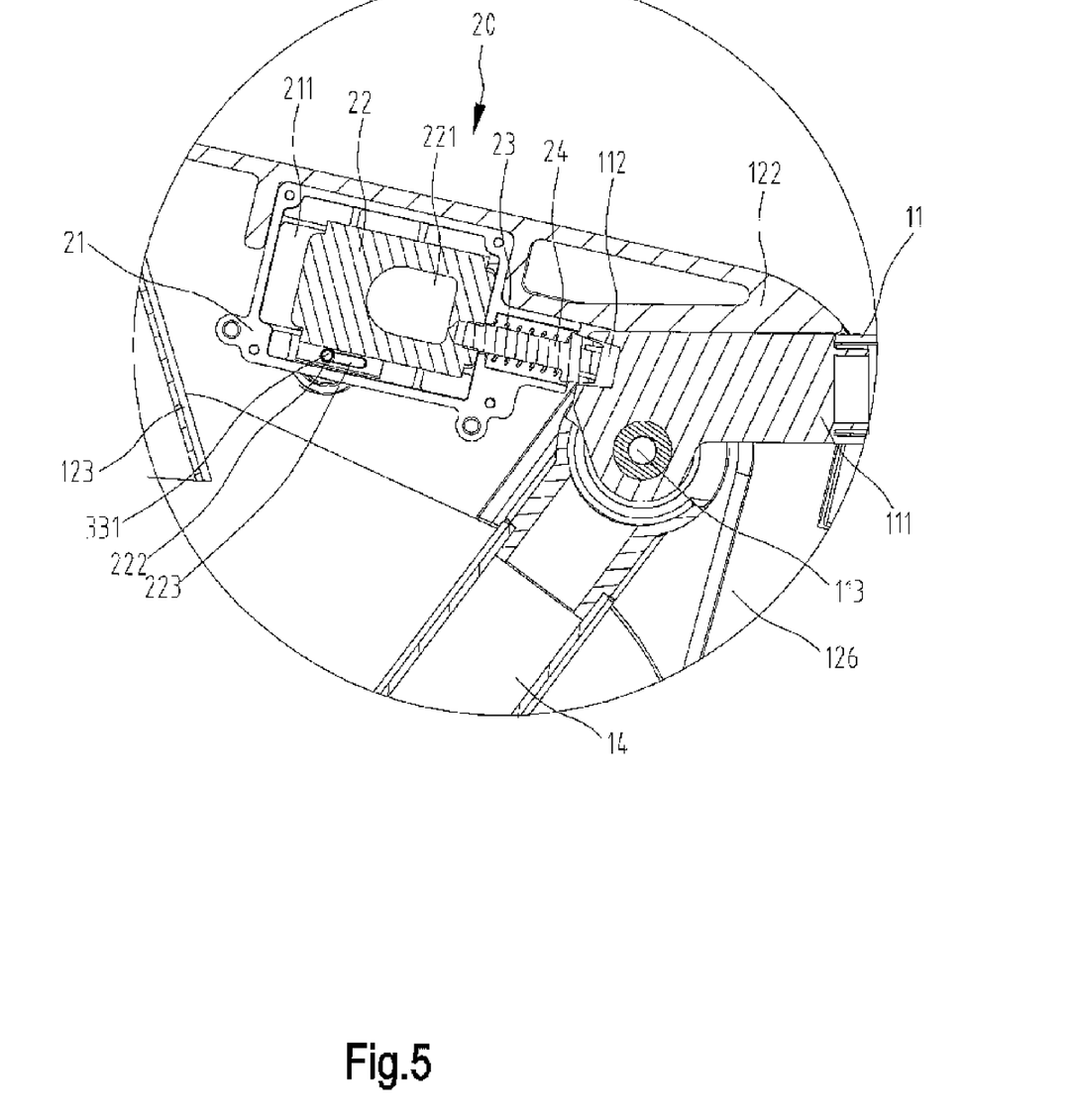
FIG. 5 is an enlarged cross-sectional view of the collapsible bicycle shown in FIG. 4.
Figure 6:
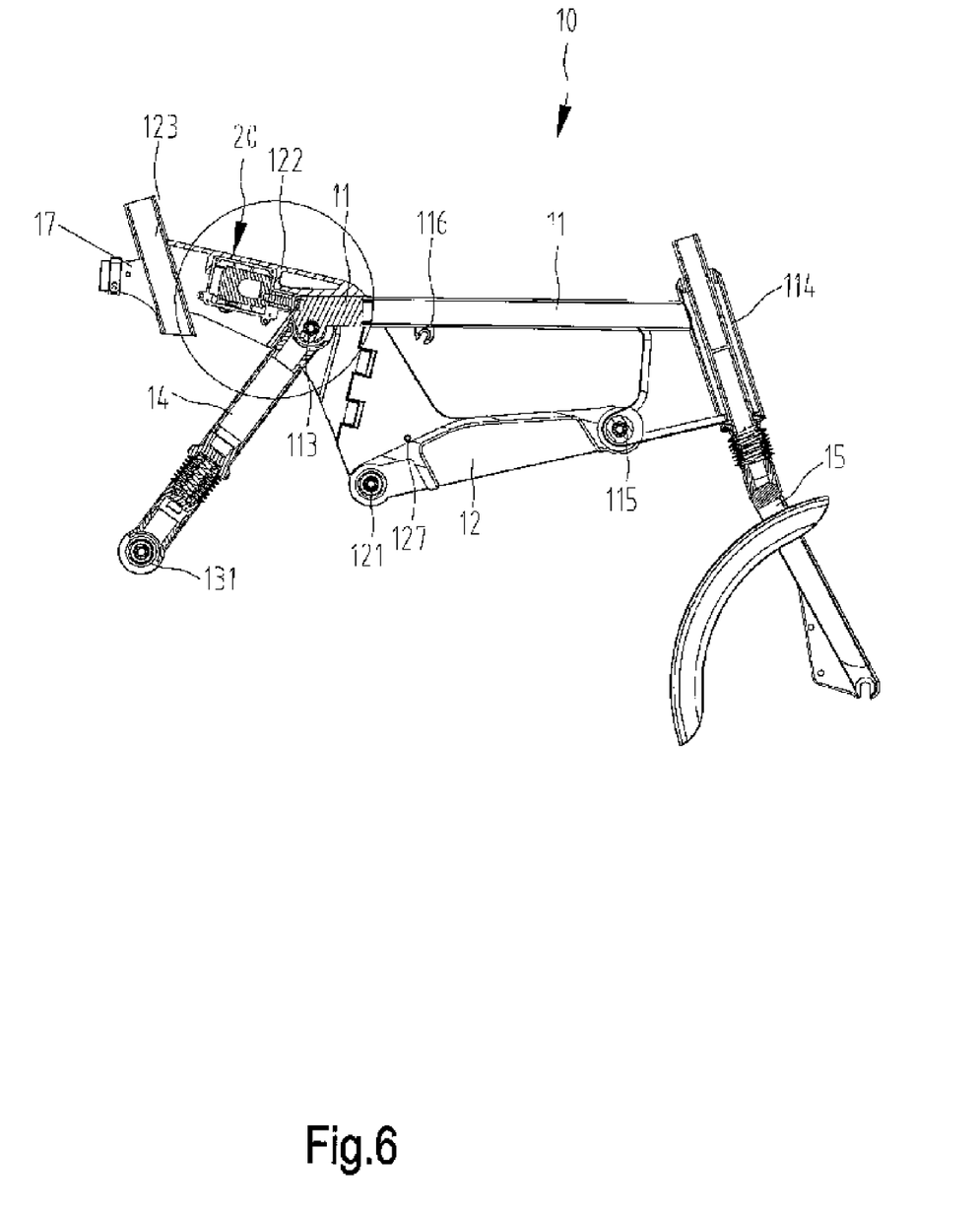
FIG. 6 is a reduced cross-sectional view of the collapsible bicycle shown in FIG. 5.
Figure 7:
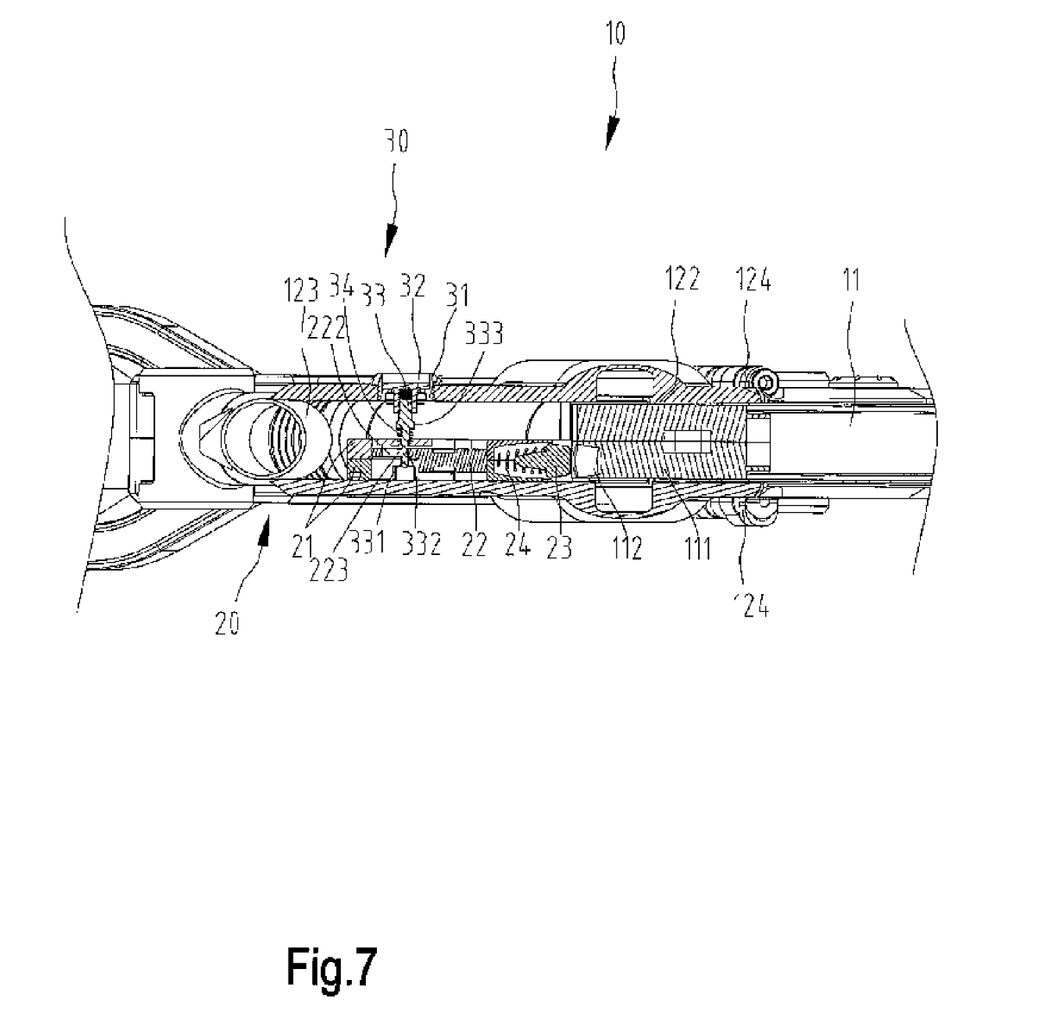
FIG. 7 is similar to FIG. 4 but shows the collapsible bicycle ready to be collapsed.
Figure 8:
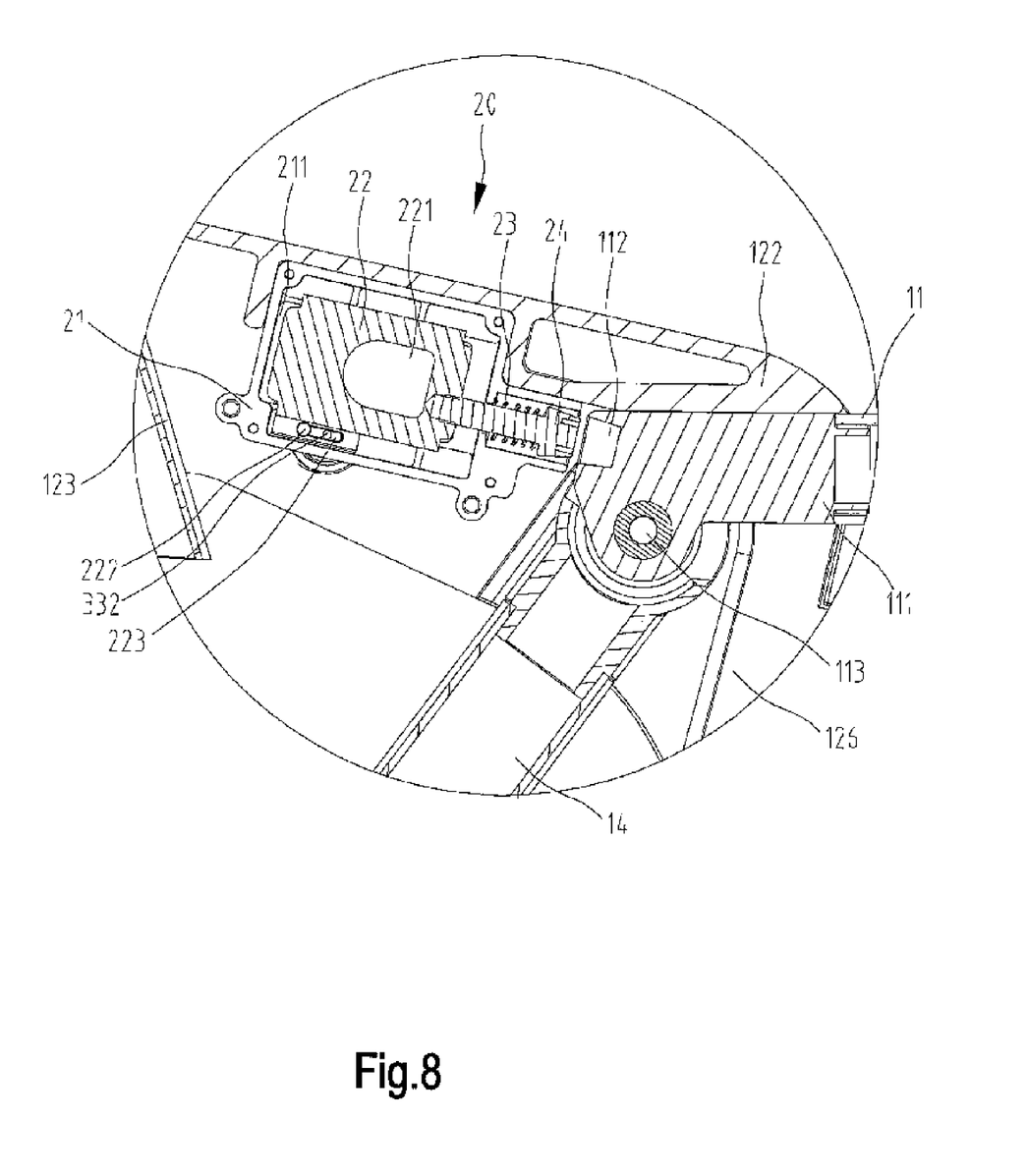
FIG. 8 is an enlarged cross-sectional view of the collapsible bicycle shown in FIG. 7.
Figure 9:
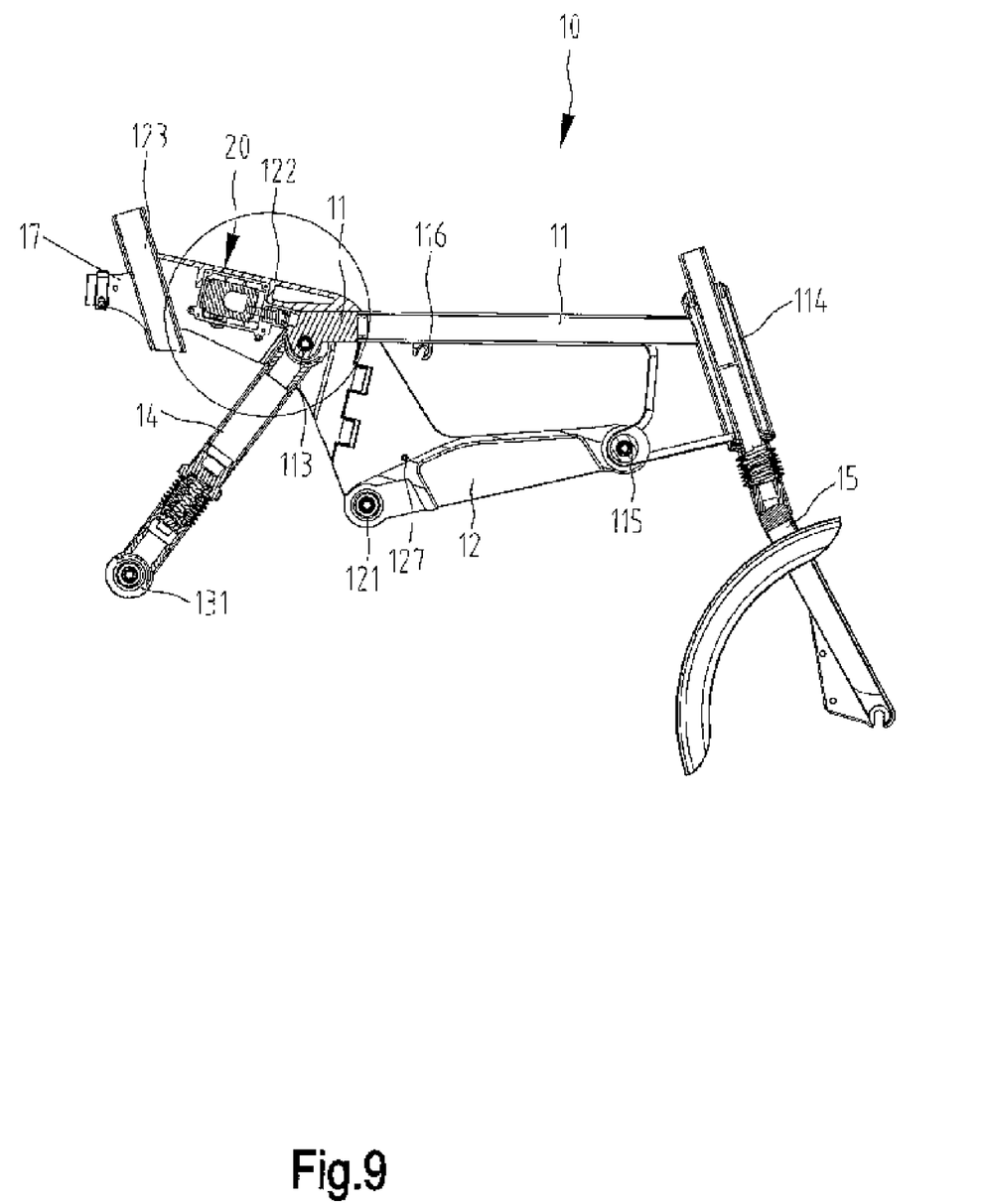
FIG. 9 is a reduced cross-sectional view of the collapsible bicycle shown in FIG. 8.

The retaining device 20 can be switched between a retaining position shown in FIGS. 4 through 6 and a releasing position shown in FIGS. 7 through 9. In the retaining position, the retaining device 20 retains the collapsible frame 10 in the extended position. In the releasing position, the retaining device 20 allows the collapsible frame 10 to be switched to the collapsed position.

The security device 30 can be switched between a locking position shown in FIGS. 4 through 6 and a releasing position shown in FIGS. 7 through 9. In the locking position, the security device 30 locks the retaining device 20 in the retaining position. In the releasing position, the security device 30 allows the retaining device 20 to be switched to the releasing position.

The collapsible frame 10 includes a head tube 114, a top tube 11, a support member 12, a chain stay 13 and a link 14. The top tube 11 is connected with the head tube 114. The support member 12 is connected with the head tube 114 through a joint 115. The chain stay 13 is connected with the support member 12 through a joint 121. An end of the link 14 is connected with the chain stay 13 through a joint 131.

An opposite end of the link 14 is connected with the top tube 11 through a joint 113. As shown, the link 14 is a suspension. However, the link 14 may simply be a tube.

Moreover, the collapsible bicycle 1 includes a stem 40, a foldable handlebar 16, a front fork 15, a front wheel 42, a seat tube 123, a seat post 17, a seat 18, two pedals 19 and a rear wheel 44. The stem 40 is connected with the head tube 114. The foldable handlebar 16 is provided on the stem 40. The front fork 15 is connected with the head tube 114. The front wheel 42 is provided on the front fork 15. The seat tube 123 is connected with the support 12. The seat post 17 is partially inserted in the seat tube 123. The seat 18 is provided on the seat post 17. The pedals 19 are provided on the chain stay 13. The rear wheel 44 is provided on the chain stay 13.

On the top tube 11 is formed a C-shaped clip 116 to be described. Referring to FIG. 5, the joint 113 is integrated with an end element 111. The end element 111 includes an end fit in the top tube 11 and an opposite end defining a recess 112 for receiving an element of the retaining device 20 to be described.

As clearly shown in FIG. 3, the support 12 includes two lower flank members 126 and two upper flank members 122. Together, the lower flank members 126 are used as a typical down tube. Together, the upper flank members 122 support the retaining device 20 and the security device 30. Each lower flank member 126 is pivotally connected with a related upper flank member 122 by a hinge consisting of several sleeves 124 and a pin 125. Between the lower flank members 126 is defined a space for receiving the top tube 11 in the collapsed position of the collapsible bicycle 1. Between the upper flank members 122 is defined a space for receiving the top tube 11 in the extended position of the collapsible bicycle 1. For the convenience of description, the upper flank members 122 will be referred to as first and second upper flank members 122. The first upper flank member 122 defines a window 128 for allowing access to the retaining device 20. The second upper flank member 122 defines an aperture 129 to be described. The seat tube 123 is secured to the second upper flank member 122.

The retainer 20 includes a guide 21 attached to the first upper flank member 122, a trigger 22 installed in the guide 21 and a pin 23 inserted through the guide 21 and connected with the trigger 22. A spring 24 is compressed between a portion of the guide 21 and an enlarged head of the pin 23. Biased by the spring 24, the head of the pin 23 is inserted in the recess 112 in order to retain the collapsible bicycle 1 in the extended position. The guide 21 includes two halves that are made separate. The halves of the guide 21 are assembled after the trigger 22 is put between them. The guide 21 defines a space 211 for receiving the trigger 22. The pin 23 can drive through pulling the trigger 22. The guide 21 defines an aperture 212 for receiving the pin 23.

The security device 30 includes a pin 33, a ring 31 and a button 32. The pin 33 can be engaged with the trigger 22. The ring 31 retains the pin 33 in the space defined between the upper flank members 122. The button 32 is attached to the pin 33.

Referring to FIGS. 4 and 5, the retainer 20 and the security device 30 will be further described. The trigger 22 defines an opening 221 for receiving a user's finger, an aperture 222 and a slot 223 communicated with the aperture 222. The diameter of the aperture 222 is larger than the width of the slot 223. The pin 33 includes a shoulder 333, a neck 332 formed on the shoulder 333 and a head 331 formed on the neck 332. The diameter of the head 331 is larger than that of the neck 332. The diameter of the shoulder 333 is larger than that of the head 331. A spring 34 is compressed between one of the halves of the guide 21 and the shoulder 333 of the pin 33.

Normally, the pin 33 is biased by the spring 34, and the head 331 of the pin 33 is retained in the aperture 222. Thus, the trigger 22 cannot be pulled. Accordingly, the pin 23 is retained in the recess 112. Hence, the collapsible bicycle 1 is retained in the extended position.

Referring to FIGS. 7 through 9, the button 32 is pushed. Thus, the pin 33 is pushed. The head 331 is moved from the aperture 222. The neck 332 is moved into the aperture 222 and aligned with the slot 223. Sliding of neck 332 in the slot 223 is allowed. Thus, the trigger 22 can be pulled relative to the pin 33. Hence, the collapsible bicycle 1 can be switched to the collapsed position.

Figure 12:
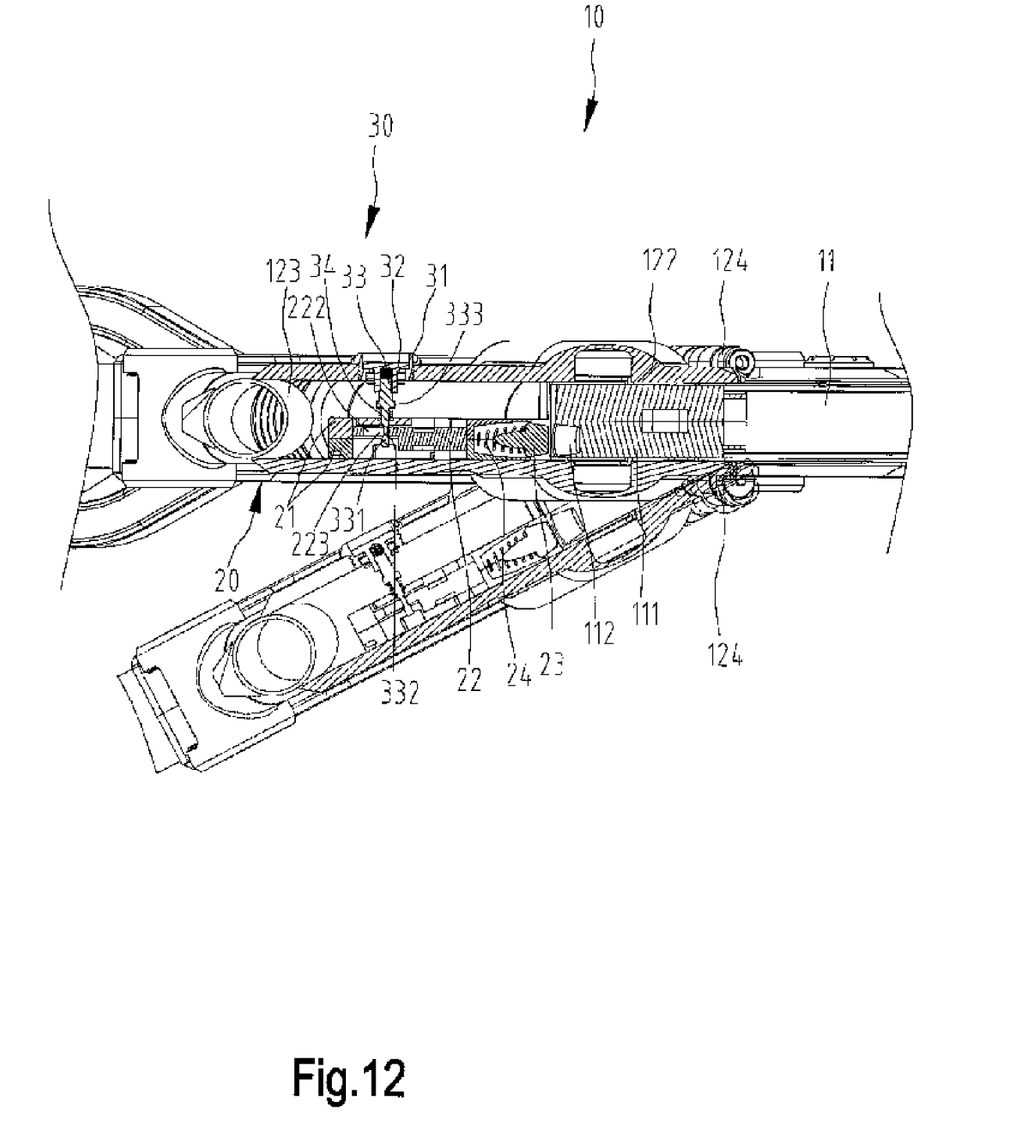
FIG. 12 is an enlarged cross-sectional view of a portion of the collapsible bicycle shown in FIG. 1.

Through the process described with reference to FIGS. 7 through 9, and by lifting the upper flank portions 122, the collapsible bicycle 1 is switched from the extended position shown in FIG. 10 to the transient position shown in FIG. 11. The front wheel 42 is very close to the rear wheel 44. However, the front wheel 42 is still aligned with the rear wheel 44. The collapsible bicycle 1 seems to shrink in a horizontal direction. The C-shaped clip 116 holds a pin 127 extending between the lower flank members 126. Thus, the collapsible bicycle 1 is retained in the collapsed position. Referring to FIG. 12, the upper flank members 122 are pivoted to a side of the collapsible bicycle 1. The collapsible bicycle 1 is finally switched to the collapsed position shown in FIG. 13.

The collapsible bicycle 1 of the present invention includes several advantageous features. Firstly, the proper operation of the retaining device 20 is ensured since the retaining device 20 is put between the upper flank members 122. Secondly, the proper operation of the retaining device 20 is ensured by the use of the security device 30. Thirdly, the collapsing of the collapsible bicycle 1 is easy. Fourthly, the collapsible bicycle 1 occupies a small space in the collapsed position. Fifthly, in the collapsed position, the collapsible bicycle 1 can easily be pushed as the wheels 42 and 44 are still in a front-and-rear relation and can roll on the ground.

The present invention has been described through the foregoing description of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A collapsible bicycle comprising:
  a collapsible frame that can be switched between an extended position and a collapsed position in a longitudinal direction so that the wheels of the collapsible bicycle can still roll on the ground when the collapsible frame is in the collapsed position, wherein the collapsible frame comprises a head tube, a seat tube, a top tube connected with the head tube, a support member, a chain stay and a link comprising a lower end pivotally connected with the chain stay and an upper end pivotally connected with the top tube, wherein the support member comprises a lower portion and an upper portion pivotally connected with the lower portion about a support axis, wherein the lower portion is pivotally connected with the head tube and with the chain stay about parallel spaced axes extending at a nonparallel angle to the support axis, with the seat tube connected to the upper portion.

2. The collapsible bicycle according to claim 1 wherein the collapsible frame comprises a joint for connecting the support member with the head tube.

3. The collapsible bicycle according to claim 1 wherein the collapsible frame comprises a joint for connecting the chain stay with the support member.

4. The collapsible bicycle according to claim 1 wherein the collapsible frame comprises a joint for connecting the lower end of the link with the chain stay.

5. The collapsible bicycle according to claim 1 wherein the collapsible frame comprises a joint for connecting the upper end of the link with the top tube.

6. The collapsible bicycle according to claim 1 further comprising:
 a retaining device comprising a trigger operable in order to switch the retaining device between a retaining position retaining the collapsible frame in the extended position and a releasing position allowing the collapsible frame to be switched to the collapsed position, wherein the retaining device is installed on the upper portion for engagement with the top tube in the extended position.

7. The collapsible bicycle according to claim 6 wherein the lower portion of the support member comprises two flank members between which the top tube can be pivoted, wherein the upper portion of the support member comprises two flank members between which the top tube can be pivoted.

8. The collapsible bicycle according to claim 7 wherein the retaining device is provided between the upper flank members.

9. The collapsible bicycle according to claim 8 wherein the top tube defines a recess, wherein the retaining device comprises a pin connected with the trigger for insertion in the recess of the top tube in the extended position of the collapsible frame.

10. The collapsible bicycle according to claim 9 wherein the top tube comprises an end element fit to an end thereof, wherein the end element defines the recess.

11. The collapsible bicycle according to claim 9 wherein the trigger defines an opening for receiving a user's finger.

12. The collapsible bicycle according to claim 9 wherein one of the upper flank members defines a window for allowing access to the trigger.

13. The collapsible bicycle according to claim 9 wherein the retaining device comprises a guide provided between the upper flank members for guiding the trigger.

14. The collapsible bicycle according to claim 13 wherein the guide consists of two halves.

15. The collapsible bicycle according to claim 13 wherein the guide defines a space for receiving the trigger.

16. The collapsible bicycle according to claim 15 wherein the guide defines an aperture communicated with the space for receiving the pin.

17. The collapsible bicycle according to claim 13 wherein the retaining device comprises a spring compressed between a portion of the pin and a portion of the guide for pushing the pin into the recess of the top tube.

18. A collapsible bicycle comprising:
 a collapsible frame that can be switched between an extended position and a collapsed position in a longitudinal direction so that the wheels of the collapsible bicycle can still roll on the ground when the collapsible frame is in the collapsed position;
 a retaining device comprising a trigger operable in order to switch the retaining device between a retaining position retaining the collapsible frame in the extended position and a releasing position allowing the collapsible frame to be switched to the collapsed position; and
 a security device that can be switched between a locking position locking the trigger and a releasing position releasing the trigger.

19. The collapsible bicycle according to claim 18 wherein the security device comprises a pin for engagement with the trigger in the locking position and disengagement from the trigger in the releasing position.

20. The collapsible bicycle according to claim 19 wherein the trigger defines an aperture and a slot communicated with the aperture, wherein the diameter of the aperture is larger than the width of the slot, wherein the pin comprises a head trapped in the aperture of the trigger in the locking position and a neck for movement in and along the slot of the trigger in the releasing position.

21. The collapsible bicycle according to claim 20 wherein the pin comprises a shoulder integrated with the neck, wherein the security device comprises a spring compressed between the shoulder of the pin and the trigger for bringing the head of the pin into the aperture of the trigger.

22. The collapsible bicycle according to claim 21 wherein the security device comprises a button attached to the pin.

23. The collapsible bicycle according to claim 19, wherein the collapsible frame comprises a head tube, a top tube connected with the bead tube, a support member pivotally connected with the head tube, a chain stay pivotally connected with the support member and a link comprising a lower end pivotally connected with the chain stay and an upper end pivotally connected with the top tube, wherein the support member comprises a lower portion and an upper portion pivotally connected with the chain stay and an upper portion pivotally connected with the lower portion, wherein the retaining device is installed on the upper portion for engagement with the top tube in the extended position, wherein the upper portion of the support comprises two upper flank members between which the top tube can be pivoted.

24. The collapsible bicycle according to claim 23 wherein one of the upper flank members defines an aperture for allowing access to the pin.

25. The collapsible bicycle according to claim 24 wherein the security device comprises a ring fit in the aperture of the upper flank member for keeping the pin in position.

26. The collapsible bicycle according to claim 7 wherein the collapsible frame comprises a pin extending between the flank members of the lower portion and a clip formed on the top tube for holding the pin in the collapsed position of the collapsible frame.

27. The collapsible bicycle according to claim 7 comprising a hinge for pivotally connecting each of the flank members of the upper portion with related one of the flank members of the lower portion.

28. The collapsible bicycle according to claim 1 wherein the link is a suspension.

* * * * *